United States Patent
Sridharan et al.

(10) Patent No.: US 10,509,705 B2
(45) Date of Patent: Dec. 17, 2019

(54) APPLICATION PROTECTION THROUGH A COMBINED FUNCTIONALITY FAILURE MANAGER

(75) Inventors: Srineet Sridharan, Pune (IN); Vikas Jain, Maharashtra (IN); Phani Karthik Maradani, Maharashtra (IN); Jahangir Ahmad, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 421 days.

(21) Appl. No.: 13/289,974

(22) Filed: Nov. 4, 2011

(65) Prior Publication Data

US 2013/0117231 A1  May 9, 2013

(51) Int. Cl.
- G06F 7/00 (2006.01)
- G06F 11/14 (2006.01)
- G06F 11/20 (2006.01)
- G06F 11/07 (2006.01)

(52) U.S. Cl.
CPC ...... *G06F 11/1482* (2013.01); *G06F 11/1469* (2013.01); *G06F 11/0709* (2013.01); *G06F 11/0793* (2013.01); *G06F 11/1438* (2013.01); *G06F 11/1458* (2013.01); *G06F 11/1484* (2013.01); *G06F 11/2023* (2013.01); *G06F 11/2035* (2013.01)

(58) Field of Classification Search
CPC .................................................. G06F 11/0709
USPC .................. 707/705, 999.102, 999.101, 649
See application file for complete search history.

(56) References Cited

U.S. PATENT DOCUMENTS

| | | | |
|---|---|---|---|
| 3,642,588 A * | 2/1972 | Charrier | C25D 3/02 205/238 |
| 5,044,341 A * | 9/1991 | Henning | F02D 41/0045 123/520 |
| 5,864,677 A * | 1/1999 | Van Loo | H04L 1/1806 370/403 |
| 6,404,140 B1 * | 6/2002 | Nerone | H05B 41/2883 315/209 R |
| 7,069,334 B2 * | 6/2006 | Wysoczynski | G06F 11/1433 709/227 |
| 7,317,537 B2 * | 1/2008 | Haque | G01C 19/72 356/460 |
| 7,657,887 B2 * | 2/2010 | Kothandaraman | H04L 67/06 717/170 |
| 7,698,728 B2 * | 4/2010 | Musser, Jr. | G11B 27/36 725/144 |
| 8,185,776 B1 * | 5/2012 | Gentes | G06F 11/1438 709/223 |
| 2002/0087687 A1 * | 7/2002 | Zaifman | G06F 11/0781 709/225 |

(Continued)

*Primary Examiner* — Eliyah S. Harper
(74) *Attorney, Agent, or Firm* — Patent Law Works LLP

(57) ABSTRACT

A method for providing application functionality protection. The method includes accessing a distributed computer system having a cluster including a plurality of nodes, and receiving an indication of an application failure. The method further includes attempting to restore the application through a number of application restart attempts, and receiving an indication that the restart attempts have not restored the application. An image history is then accessed to obtain a last known good point in time image of the application. The application is restored in accordance with the last known good point in time image.

14 Claims, 10 Drawing Sheets

(56) References Cited

U.S. PATENT DOCUMENTS

| | | | |
|---|---|---|---|
| 2002/0174379 A1* | 11/2002 | Korenevsky | G06F 11/1461 714/19 |
| 2003/0237007 A1* | 12/2003 | Ramirez | G06F 1/24 713/300 |
| 2004/0059802 A1* | 3/2004 | Jacquemot et al. | 709/220 |
| 2004/0172632 A1* | 9/2004 | Smith | G06F 11/1438 718/101 |
| 2004/0260726 A1* | 12/2004 | Hrle et al. | 707/104.1 |
| 2005/0038772 A1* | 2/2005 | Colrain | G06F 9/5061 |
| 2005/0278583 A1* | 12/2005 | Lennert | G06F 11/1461 714/43 |
| 2007/0043860 A1* | 2/2007 | Pabari | G06F 9/5072 709/224 |
| 2007/0088970 A1* | 4/2007 | Buxton et al. | 714/2 |
| 2007/0162785 A1* | 7/2007 | Downer | G06F 11/1402 714/15 |
| 2008/0235659 A1* | 9/2008 | Manglik | G06F 11/366 717/111 |
| 2010/0037092 A1* | 2/2010 | Zamora | G06F 11/1417 714/6.12 |
| 2010/0076934 A1* | 3/2010 | Pershin et al. | 707/640 |
| 2011/0276539 A1* | 11/2011 | Thiam | G06F 11/1448 707/634 |
| 2012/0030670 A1* | 2/2012 | Vijay | G06F 9/45558 718/1 |
| 2012/0233123 A1* | 9/2012 | Shisheng | G06F 11/004 707/639 |
| 2012/0233448 A1* | 9/2012 | Malkhasyan | G06F 8/63 713/2 |

* cited by examiner

APPLICATION PROTECTION THROUGH A COMBINED FUNCTIONALITY FAILURE MANAGER

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail. Normally, if a server with a particular application crashes, the application will be unavailable until someone fixes the crashed server. HA clustering remedies this situation by detecting hardware/software faults, and immediately restarting the application on another system without requiring administrative intervention, a process known as Failover. As part of this process, clustering software may configure the node before starting the application on it. For example, appropriate file systems may need to be imported and mounted, network hardware may have to be configured, and some supporting applications may need to be running as well.

HA clusters are often used for critical databases, file sharing on a network, business applications, and customer services such as electronic commerce websites. HA cluster implementations attempt to build redundancy into a cluster to eliminate single points of failure, including multiple network connections and data storage which is multiply connected via storage area networks or Internet protocol-based storage. Additionally, HA clusters are often augmented by connecting them to multiple redundant HA clusters to provide disaster recovery options.

However, there exists a problem in that there is no functionality that can control both cluster failover processes and cluster backup processes. This lack of functionality can seriously reduce the uptime of an HA cluster.

SUMMARY OF THE INVENTION

Embodiments of the present invention provide application functionality protection. Embodiments of the present invention efficiently implement a cluster wide application failover that greatly enhances application availability.

In one embodiment, the present invention is implemented as a computer implemented method for providing application functionality protection. The method includes accessing a distributed computer system having a cluster including a plurality of nodes, and receiving an indication of an application failure. The method further includes attempting to restore the application through a number of application restart attempts, and receiving an indication that the restart attempts have not restored the application. An image history is then accessed to obtain a last known good point in time image of the application. The application is restored in accordance with the last known good point in time image.

In one embodiment, the restart attempts include at least one restart of the node machine.

In one embodiment, the image history comprises a plurality of point in time snapshots.

In one embodiment, a user indication is required to proceed with restoration with the last known good point in time image.

In one embodiment, the number of application restart attempts is pre-configurable.

In one embodiment, the application functionality protection is implemented through a failure manager having combined access to failover functionality and backup functionality.

In one embodiment, the distributed computer system comprises a plurality of clusters of nodes.

In one embodiment, restoring the application includes restoring a virtual machine to the last known good point in time image In one embodiment, the present invention is implemented as a computer readable storage medium having stored thereon, computer executable instructions that, if executed by a computer system cause the computer system to perform a method for providing application functionality protection. The method includes accessing a distributed computer system having a cluster including a plurality of nodes, receiving an indication of an application failure, attempting to restore the application through a number of application restart attempts, receiving an indication that the restart attempts have not restored the application, accessing an image history to obtain a last known good point in time image of the application, and restoring the application in accordance with the last known good point in time image.

In one embodiment, the present invention is implemented as a server computer system. The server computer system has a processor coupled to a computer readable storage media and executing computer readable code which causes the computer system to implement a failure manager that functions by accessing a distributed computer system having a cluster including a plurality of nodes, receiving an indication of an application failure, attempting to restore the application through a number of application restart attempts, receiving an indication that the restart attempts have not restored the application, accessing an image history to obtain a last known good point in time image of the application, and restoring the application in accordance with the last known good point in time image.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
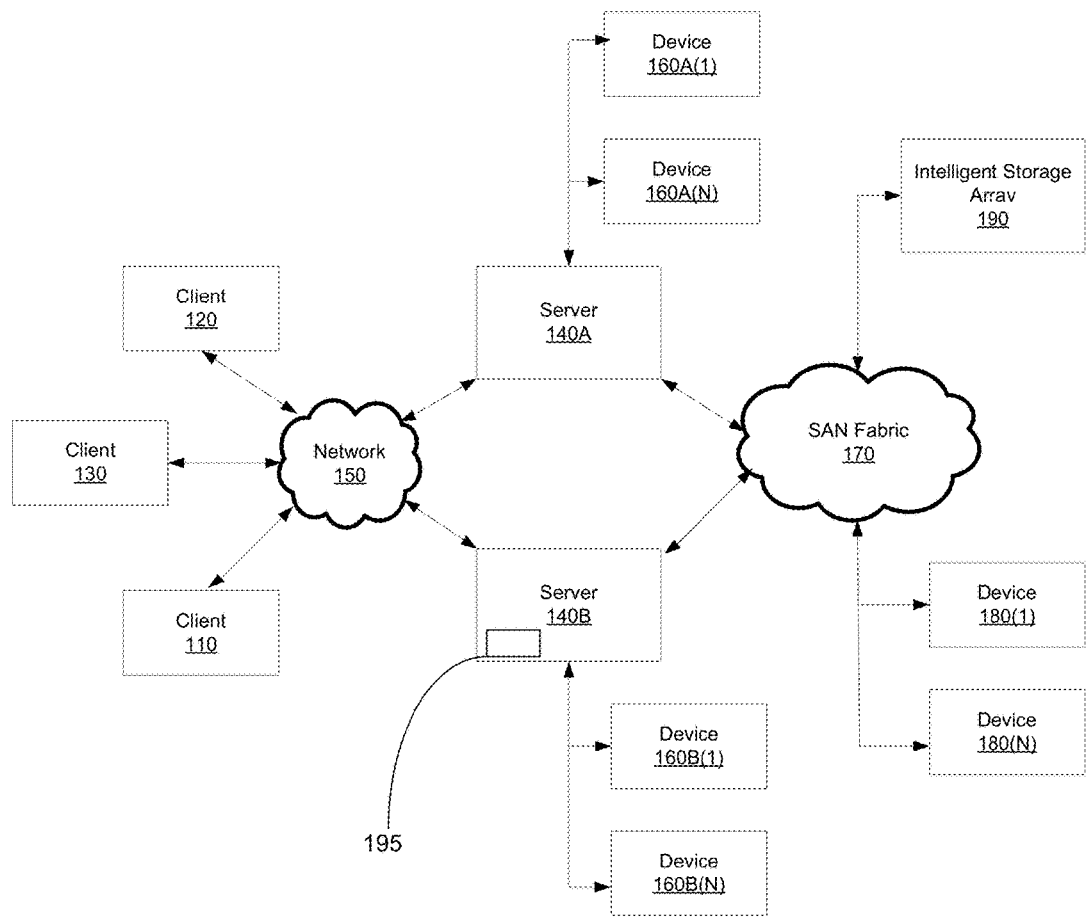
FIG. 1 shows a block diagram depicting a network architecture in accordance with one embodiment of the present invention. .

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1 is a block diagram depicting a network architecture 100 in which client systems 110, 120 and 130, as well as storage servers 140A and 140B are coupled to a network 150 in accordance with one embodiment of the present invention. The storage servers 140A and 140B can be used to instantiate one or more virtual machines. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a failure manager 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

Figure 2:
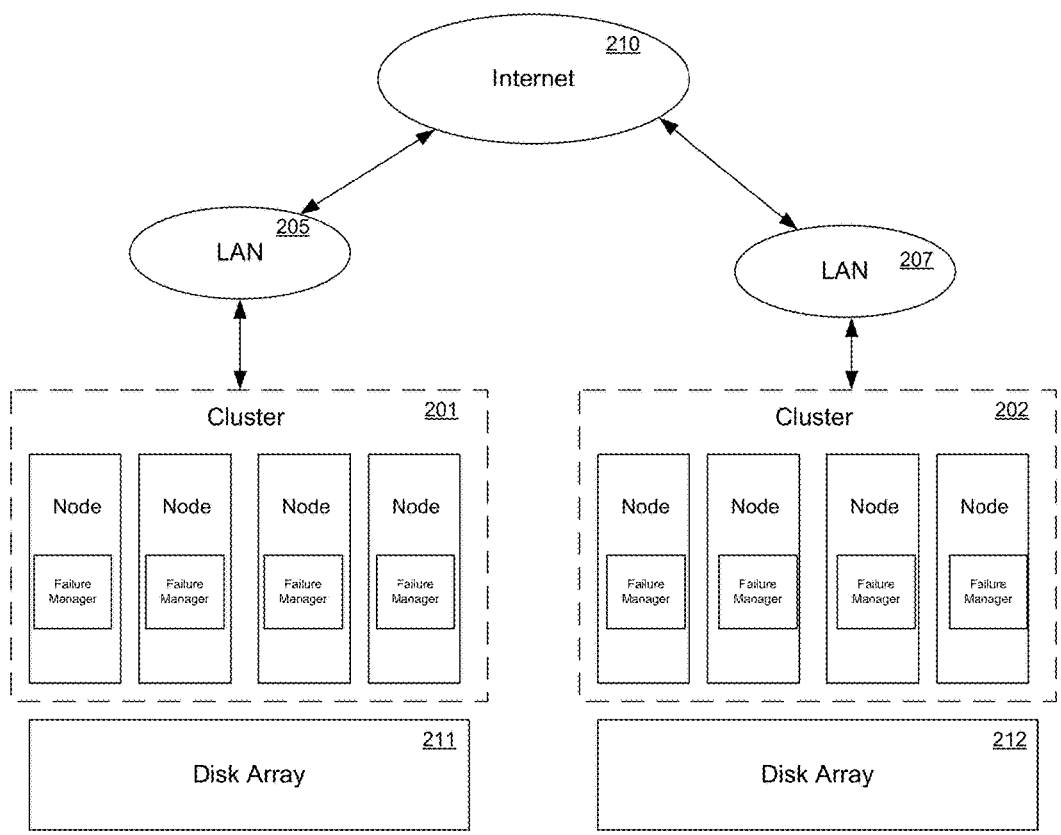
FIG. 2 shows a diagram depicting a high availability multi-cluster-based computing system in accordance with one embodiment of the present invention.

FIG. 2 shows a diagram depicting a high availability multi-cluster-based computing system in accordance with one embodiment of the present invention. As illustrated in FIG. 2, two clusters 201-202 are shown. The clusters 201-202 each comprise a four node cluster. Each of the constituent nodes is shown connected to a respective disk array 211-212. The nodes of each cluster communicate with one another via local area networks 205-207. These local area networks are in turn connected to the Internet 210. Although the embodiments described in the context of clusters of four nodes, it should be appreciated that embodiments of the present invention can readily scale and function in distributed computer systems and/or cloud based computer systems having hundreds or thousands of nodes.

Thus, FIG. 2 shows the basic layout of a typical high-availability multi-cluster computer system environment. As described above, a high availability cluster is a computer cluster that functions primarily by providing high availability of services to users and/or applications. The multiple redundant nodes of each cluster are used to provide service in case one or more nodes of a cluster should fail. For example, if a node with a particular application crashes, the application will be unavailable until the node is recovered. HA clustering implements a fail over of the particular application to one of the redundant nodes of the cluster.

FIG. 2 also shows the inclusion of a plurality of failure managers in each of the clusters 201-202. The failure managers implement the fast cluster failure detection and cluster wide fail over functionality of embodiments of the present invention. In the FIG. 2 embodiment, the storage and the input and output to that storage is provided by the respective disk arrays 211-212. The failure managers implement the functionality whereby with an application failure occurs, clustering software functionality attempts recovery by restarting the application, restarting the node, or failing over the application to another node or another cluster. The failure managers function as tie in between clustering software that monitors real time application and node machine health, and a backup infrastructure that is protecting node machine state and the application data.

As described above, the failure managers integrate control functionality of application high-availability (e.g., via clustering software, file systems, volume managers, or the like) and application backups (e.g., snapshots, images, or the like). In accordance with embodiments of the present invention, the integrated functionality of the failure managers are able to provide more complete application protection.

For example, when an application failure occurs, the failure manager ensures an agent (e.g., clustering software, or the like) attempts N application restarts. If that number of restarts does not succeed, the failure manager can restart the machine. Additionally, as another remediation alternative, the application can be failed over to another node. In one embodiment, this node is a physical node of the cluster, while in another embodiment, the node is a virtual machine. Conventionally, clustering software cannot protect against issues due to corruption of data and the like. However, in accordance with embodiments of the present invention, the failure manager causes the backup infrastructure to take action. In one embodiment, the action may involve obtaining user consent first (e.g., from an administrator). The failure manager will cause the backup infrastructure will do one of the following based on, for example, configured policies and any particular aspects of the entity that failed (e.g., whether the failed entity was an Exchange application, just one Exchange database, or the like.). The failure manager may trigger a restore of an application entity, of the entire machine node, or bring up a standby virtual machine provisioned based on a backup image. In this manner, the integrated functionality of the failure managers helps customers go back to a last-known good point in time, if number of restart attempts fail. Furthermore, although embodiments of the present invention are described in the context of multi-node clusters, the invention is compatible with single node clusters as well.

Additionally, in one embodiment, the functionality of the failure manager can be extended by going back to a still previous backup image's point-in-time if recovery using the latest backup image fails. This provides even more alternatives to ensure application high availability and minimize downtime.

Figure 3:
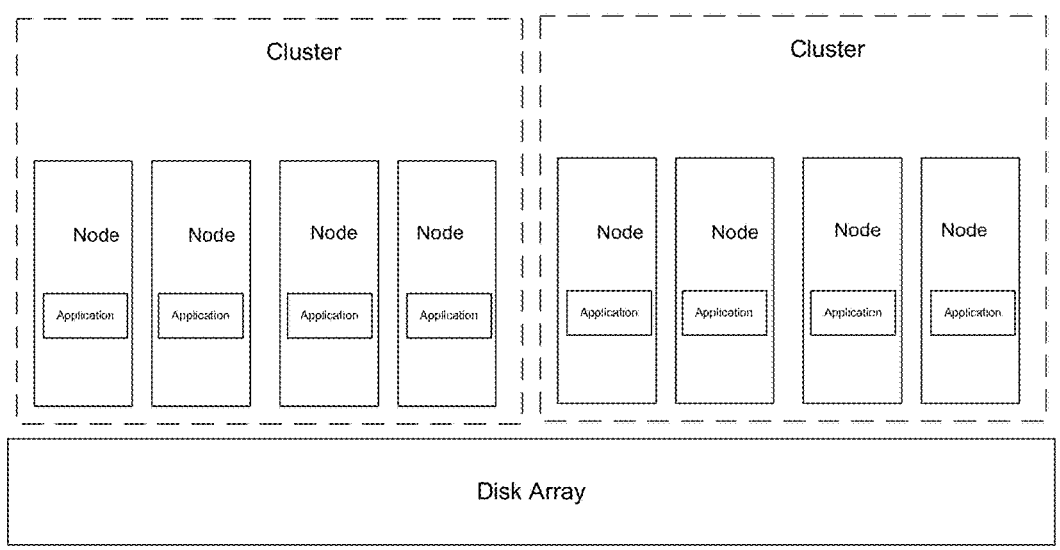
FIG. 3 shows a diagram depicting a high availability multi-cluster-based computing system in accordance with one embodiment of the present invention.

FIG. 3 shows a diagram depicting a high availability multi-cluster-based computing system in accordance with one embodiment of the present invention. The FIG. 3 embodiment is yet another alternative to the FIG. 2 embodiment in that two or more clusters are coupled to a single disk array.

As illustrated in FIG. 3, two clusters are shown, each comprising a four node cluster. Each of the constituent nodes is shown connected to a common disk array. As stated above, although the embodiments described in the context of clusters of four nodes, it should be appreciated that embodiments of the present invention can readily scale and function in distributed computer systems and/or cloud based computer systems having hundreds or thousands of nodes.

As described above, a high availability cluster is a computer cluster that functions primarily by providing high availability of services to users and/or applications. The multiple redundant nodes of each cluster are used to provide service in case one or more nodes of a cluster should fail. For example, if a node with a particular application crashes, the application will be unavailable until the node is recovered. HA clustering implements a fail over of the particular application to one of the redundant nodes of the cluster.

Figure 4:
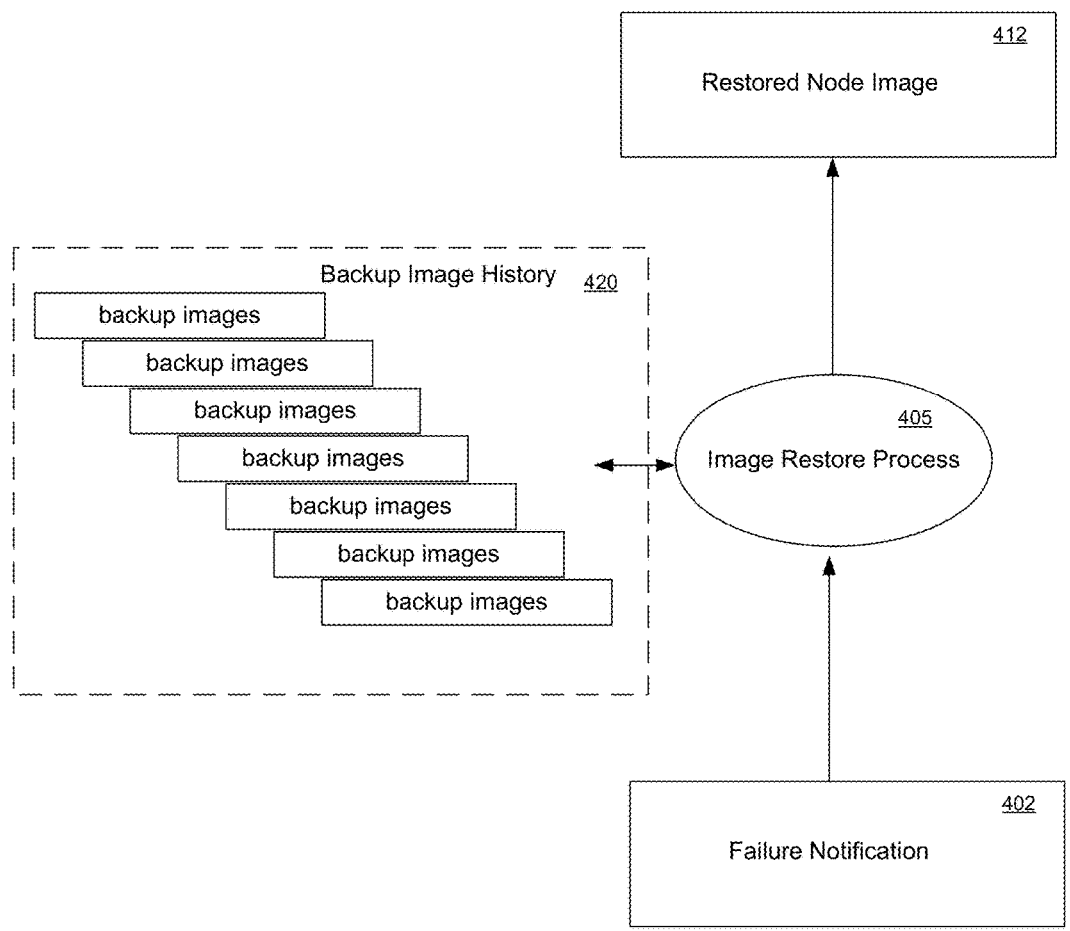
FIG. 4 shows a flow diagram of an exemplary image restore process as implemented in accordance with one embodiment of the present invention.

FIG. 4 shows a flow diagram of an exemplary image restore process as implemented in accordance with one embodiment of the present invention. As described above, the failure manager may trigger a restore of an application entity, of the entire machine node, or bring up a standby virtual machine provisioned based on a backup image. This is shown in FIG. 4 as the failure notification 402 being received by image restore process 405. In response to notification, the image restore process 405 accesses an image history 420 of backup images. In one embodiment, these images are snapshots. The backup image history contains a number of backup images going back through a period of time. By accessing the backup image history, the image restore process can implement the integrated functionality of the failure manager to get a customer back to a last-known good point in time (e.g., the restored node image 412), in those cases where a number of restart attempts fail.

Figure 5:
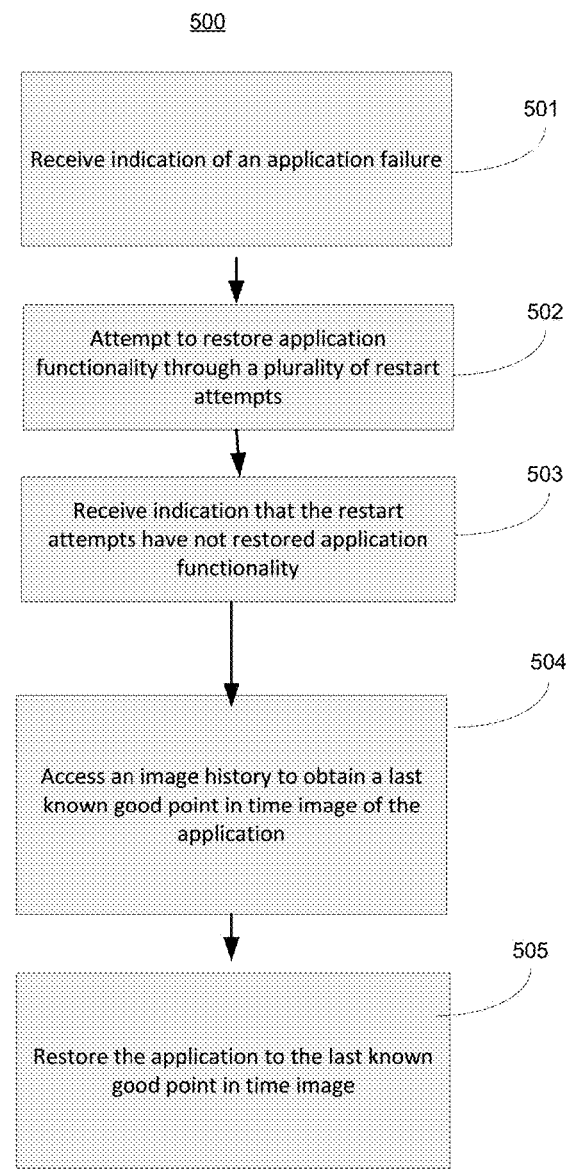
FIG. 5 shows a diagram illustrating a failover process 500 in accordance with one embodiment of the present invention.

FIG. 5 shows a diagram illustrating a failover process 500 in accordance with one embodiment of the present invention. As depicted in FIG. 5, process 500 shows exemplary operating steps of a process of proactively failing over from a failed entity.

Process 500 begins in step 501, where the failure manager receives an indication of an application failure.

In step 502, a number of attempts are made to restore avocation functionality through a plurality of restart attempts. For example, a preconfigured number of restart attempts of the application can be attempted in order to recover. Additionally, the node machine itself can be restarted.

In step 503, the failure manager receives indication that the restart attempts have not restored application functionality.

In step 504, the failure manager accesses an image history to obtain a last known good point in time image of the application. In one embodiment, this functionality is implemented via an image restore process.

In step 505, subsequently, the failure manager restores the application to its last known good point in time image, thereby restoring application functionality. As described above, in one embodiment, the failure manager can use a standby virtual machine provisioned from the last known good point in time image to restore application functionality.

Figure 6:
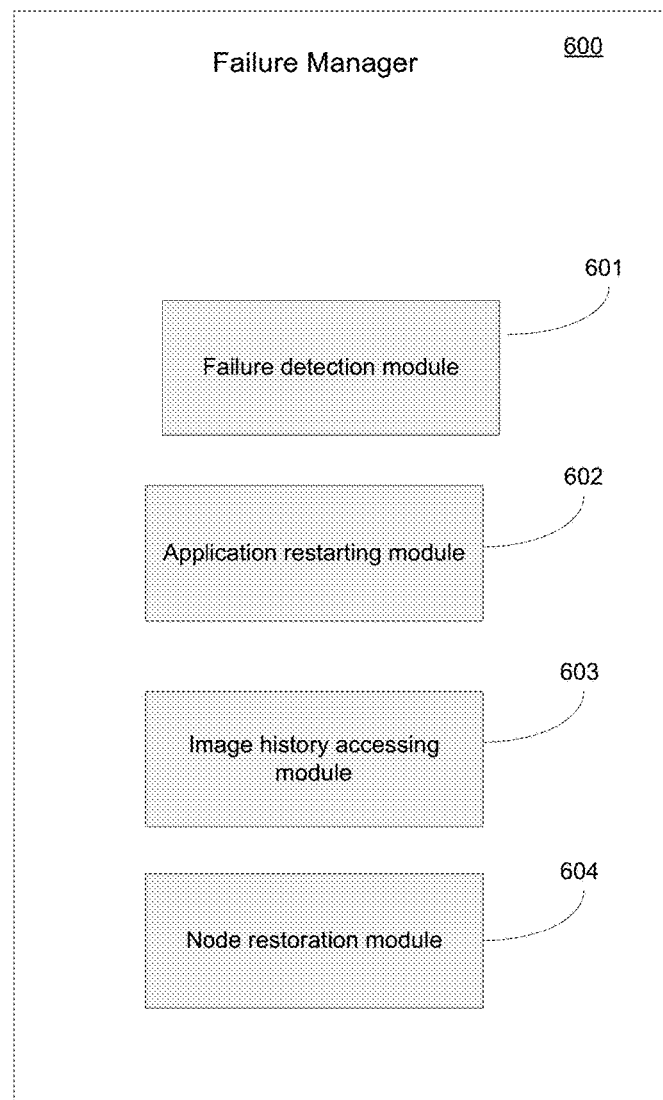
FIG. 6 shows software components an exemplary failure manager 600 in accordance with one embodiment of the present invention.

FIG. 6 shows software components an exemplary failure manager 600 in accordance with one embodiment of the present invention. In FIG. 6 embodiment, the failure manager includes a failure detection module 601 which functions by detecting occurrences of failure and initiating the process of application functionality failover. The failure manager further includes an application restarting module 602 for performing the application restart process. The failure manager further includes an image history accessing module 603 which functions by accessing image histories (e.g., snapshots, etc.) to obtain last known good point in time images. The failure manager further includes a node restoration module 604 for restoring nodes to their last known good point in time images.

Figure 7:
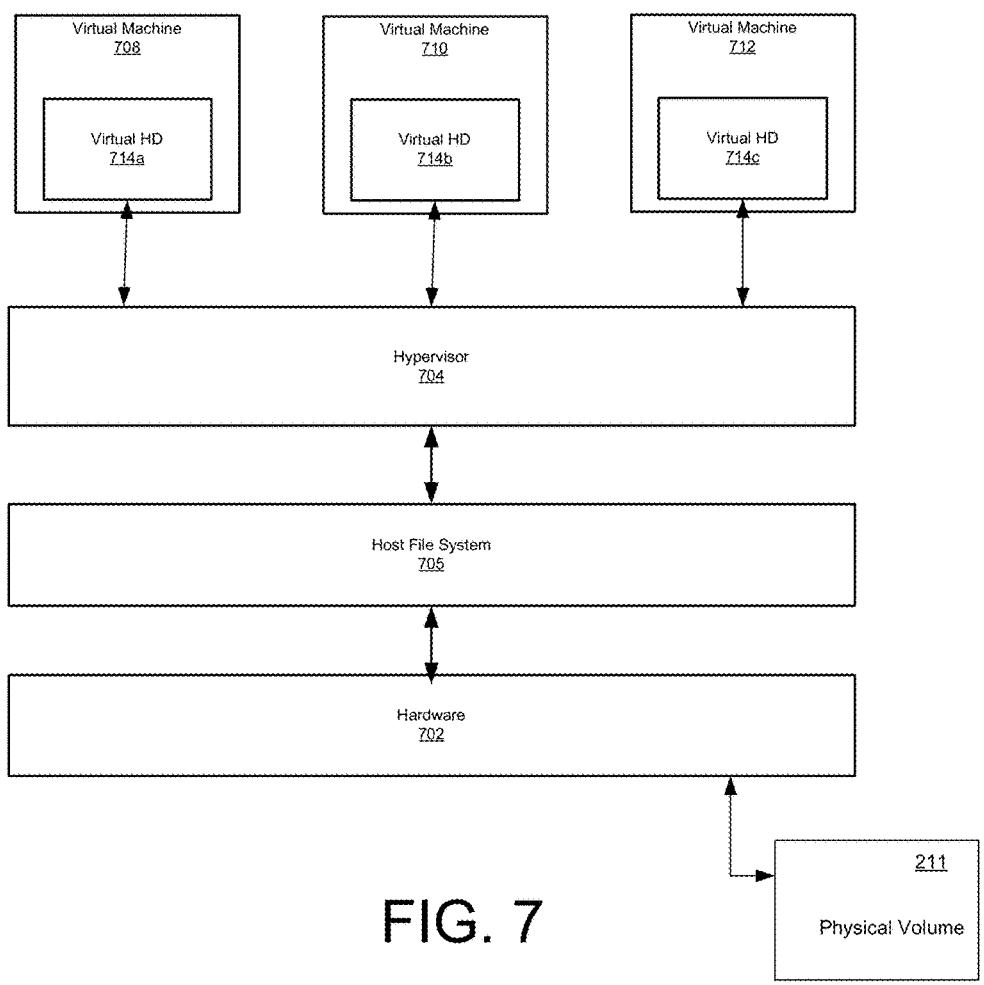
FIG. 7 shows a block diagram of an exemplary virtual environment, in accordance with one embodiment of the present invention.

FIG. 7 shows a block diagram of an exemplary virtual environment, in accordance with one embodiment of the present invention. Exemplary virtual environment 700 includes a host file system 705, hypervisor 704, and virtual machines 708-712. Components of exemplary virtual environment 700 typically execute on or otherwise be part of a distributed computing system (e.g., servers 140a and 140b of FIG. 1).

Hypervisor 704 interfaces with hardware 702 (e.g., of servers 140a-b) and provides resources and services to virtual machines 708-712. In one embodiment, hypervisor 704 is part of a trusted computing base (TCB). Hypervisor 704 provides abstractions including emulated devices of resources in hardware 702 to virtual machines 708-712. In this manner, the virtual hard drives 714a-c are emulated via the hypervisor 704 and the host file system 705 by using a physical volume 720. The physical volume 720 can be, for example, one or more LUNs on server 140A or 140B, or one of storage devices 160A(1)-(N), 160B(1)-(N), 180(1)-(N) or storage array 190. During the conversion process, data from the physical volumes is transferred to physical volume 720 which in turn instantiates the virtual file systems (e.g., virtual hard drives 714a-c).

As described above, as part of its application protection functionality, the failure manager can restore the application to its last known good point in time image by using a standby virtual machine provisioned from the last known good point in time image to restore application functionality. As shown in FIG. 7, each of the virtual machines 708-712 can be standby virtual machines managed by the failure manager. For example, each of the virtual machines can be provisioned with a high-availability agent. Upon notification, a backup server (e.g., that also provides backups of virtual machines) can restore a selected virtual machine to the last good point in time image.

FIG. 7 shows a diagram depicting another exemplary configuration of a high availability multi-cluster-based computing system in accordance with one embodiment of the present invention. The FIG. 7 embodiment is an alternative to the FIG. 2 embodiment in that the multiple LUNs are managed by a node as opposed to being in a disk array. As illustrated in FIG. 7, the four nodes of the cluster are connected to a storage node. The storage node manages the replication and data distribution across the LUNs (e.g., RAID configuration, etc.). Although the embodiments described in the context of clusters of four nodes, it should be appreciated that embodiments of the present invention can readily scale and function in distributed computer systems and/or cloud based computer systems having hundreds or thousands of nodes.

As described above, a high availability cluster is a computer cluster that functions primarily by providing high availability of services to users and/or applications. The multiple redundant nodes of each cluster are used to provide service in case one or more nodes of a cluster should fail. For example, if a node with a particular application crashes, the application will be unavailable until the node is recovered. HA clustering implements a fail over of the particular application to one of the redundant nodes of the cluster.

Figure 8:
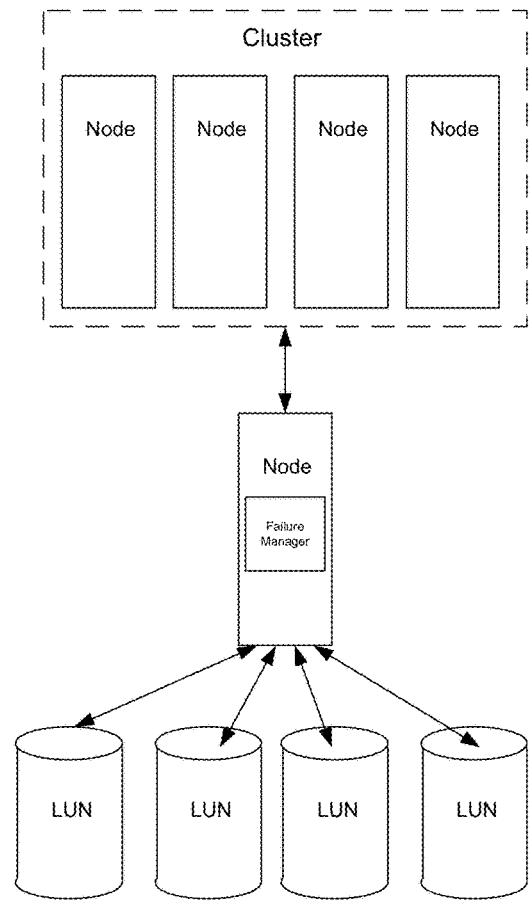
FIG. 8 shows a diagram depicting another exemplary configuration of a high availability multi-cluster-based computing system in accordance with one embodiment of the present invention.

FIG. 8 shows an exemplary computer system 800 according to one embodiment. Computer system 800 depicts the components of a basic computer system providing the execution environment for certain hardware-based and software-based functionality for the above described embodiments. For example, computer system 800 can be a system upon which the one or more software agents (e.g., failure manager 600 from FIG. 6) are instantiated. Computer system 800 can be implemented as, for example, a server computer system, workstation computer system, desktop computer system, or laptop computer system. Similarly, computer system 800 can be implemented as a handheld device. Computer system 800 typically includes at least some form of computer readable media (e.g., computer readable storage medium 801). Computer readable media can be a number of different types of available media that can be accessed by computer system 800 and can include, but is not limited to, computer storage media.

In its most basic configuration, computer system 800 typically includes processing unit 803 and memory 801. Depending on the exact configuration and type of computer system 800 that is used, memory 801 can be volatile (e.g., such as DRAM, etc.) 801a, non-volatile 801b (e.g., such as ROM, flash memory, etc.) or some combination of the two. Similarly, the memory 801 can comprise other devices besides solid-state devices, such as, for example, magnetic disk-based media, optical media, or the like.

Additionally, computer system 800 can include other mass storage systems (e.g., removable 805 and/or non-removable 807) such as magnetic or optical disks or tape. Similarly, computer system 800 can include input devices 809 and/or output devices 811 (e.g., such as a display). Computer system 800 can further include network connections 813 to other devices, computers, networks, servers, etc. using either wired or wireless media. As all of these devices are well known in the art, they need not be discussed in detail.

It should further be noted, that the computer system 800 can have some, most, or all of its functionality supplanted by a distributed computer system having a large number of dispersed computing nodes, such as would be the case where the functionality of the computer system 800 is partly or wholly executed using a cloud computing environment.

Figure 9:
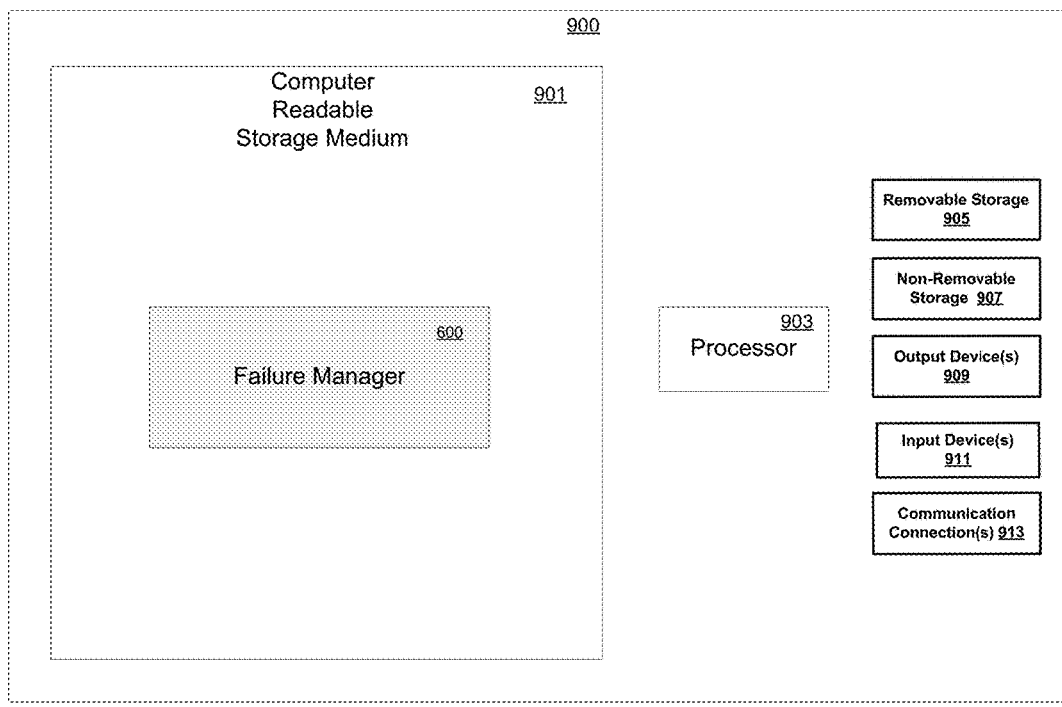
FIG. 9 shows an exemplary computer system according to one embodiment.
Figure 10:
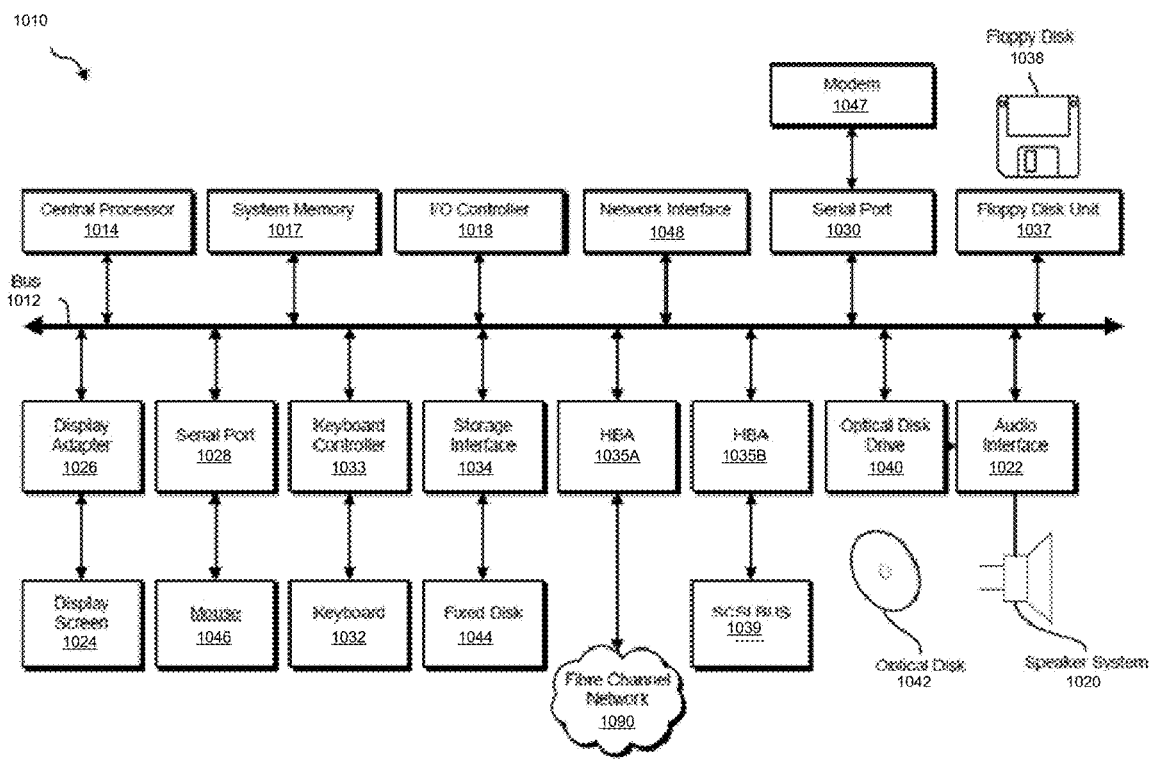
FIG. 10 depicts a block diagram of a second computer system suitable for implementing certain functionality in accordance with one embodiment of the present invention.

FIG. 9 depicts a block diagram of a second computer system 910 suitable for implementing certain functionality in accordance with one embodiment of the present invention. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fiber Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. In the FIG. 9 embodiment, the system memory 917 instantiates a replication manager module 950 which implements the continuous replication functionality described above. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for providing application functionality protection by integrated control of cluster failover processes and cluster backup processes, comprising:
   accessing a distributed computer system having a cluster including a plurality of nodes;
   receiving, at a failure manager having combined access to failover functionality and backup functionality, an indication of an application failure on a first node;
   attempting, by the failure manager, to restore the application through a preconfigured number of application restart attempts;
   determining, by the failure manager, that application restart attempts have failed;
   selecting, by the failure manager, in response to the determination, at least one secondary restart attempt to perform based on a configured policy;
   performing the at least one secondary restart attempt to restore application functionality comprising at least one of:
      restarting a machine hosting the application; and
      failing over to a second node;
   receiving, by the failure manager, an indication that the at least one secondary restart attempt has not restored the application;
   accessing, by the failure manager, a backup image history to obtain a last known good point in time backup image of the application, wherein the backup image history includes at least two prior backup images; and
   restoring, by the failure manger, the application in accordance with the last known good point in time backup image, wherein the application is restored using a standby virtual machine provisioned from the last known good point in time backup image.

2. The method of claim 1, wherein the backup image history comprises a plurality of point in time snapshots.

3. The method of claim 1, wherein a user indication is required to proceed with restoration with the last known good point in time backup image.

4. The method of claim 1, wherein the distributed computer system comprises a plurality of clusters of nodes.

5. A non-transitory computer readable storage medium having stored thereon, computer executable instructions that, if executed by a computer system cause the computer system to perform a method for providing application functionality protection by integrated control of cluster failover processes and cluster backup processes, comprising:
   accessing, by the failure manager, a distributed computer system having a cluster including a plurality of nodes;
   receiving, by the failure manager, an indication of an application failure on a first of the plurality of nodes at a failure manager having combined access to failover functionality and backup functionality;
   attempting, by the failure manager, to restore the application through a preconfigured number of application restart attempts;
   determining, by the failure manager, that the application restart attempts have failed;
   selecting, by the failure manager, in response to the determination, the at least one secondary restart attempt to perform based on a configured policy;
   performing at least one secondary restart attempt to restore application functionality comprising at least one of:
      restarting a machine hosting the application; and
      failing over to a second node;
   receiving, by the failure manager, an indication that the at least one secondary restart attempt has not restored the application;
   accessing, by the failure manager, a backup image history to obtain a last known good point in time backup image of the application, wherein the backup image history includes at least two prior backup images; and
   restoring, by the failure manager, the application in accordance with the last known good point in time backup image, wherein the application is restored using a standby virtual machine provisioned from the last known good point in time backup image.

6. The computer readable storage medium of claim 5, wherein the restart attempts include at least one restart of the node machine.

7. The computer readable storage medium of claim 5, wherein the backup "image history comprises a plurality of point in time snapshots.

8. The computer readable storage medium of claim 5, wherein a user indication is required to proceed with restoration with the last known good point in time backup image.

9. The computer readable storage medium of claim 5, wherein the distributed computer system comprises a plurality of clusters of nodes.

10. A server computer system, comprising:
    a computer system having a processor coupled to a computer readable storage media and executing computer readable code which causes the computer system to implement a failure manager having combined access to failover functionality and backup functionality to integrate control of cluster failover and cluster backup by:
       accessing, by the failure manager, a distributed computer system having a cluster including a plurality of nodes;
       receiving, by the failure manager, an indication of an application failure on a first node;
       attempting, by the failure manager, to restore the application through a number of application restart attempts;
       determining, by the failure manager, that application restart attempts have failed;
       selecting by the failure manager, in response to the determination, the at least one secondary restart attempt to perform based on a configured policy;
       performing at least one secondary restart attempt to restore application functionality comprising at least one of:
          restarting a machine hosting the application; and
          failing over to a second node;
       receiving, by the failure manager, an indication that the at least one secondary restart attempt has not restored the application;
       accessing, by the failure manager, a backup image history to obtain a last known good point in time backup image of the application, wherein the backup image history includes at least two prior backup images; and
       restoring, by the failure manager, the application in accordance with the last known good point in time backup image, wherein the application is restored using a standby virtual machine provisioned from the last known good point in time backup image.

11. The server computer system of claim 10, wherein the backup image history comprises a plurality of point in time snapshots.

12. The server computer system of claim 10, wherein a user indication is required to proceed with restoration with the last known good point in time backup image.

13. The server computer system of claim 10, wherein restoring the application includes restoring a virtual machine to the last known good point in time backup image.

14. The method of claim 1, further comprising:
    determining that restoring the application in accordance with the last known good point in time backup image has failed and
    restoring to a point in time of a backup image prior to the last known good point in time backup image.

* * * * *